US006948323B2

(12) United States Patent
Mathéoud

(10) Patent No.: US 6,948,323 B2
(45) Date of Patent: Sep. 27, 2005

(54) METHOD AND PLANT FOR DISCHARGING A LIQUEFIED GAS BETWEEN A MOBILE SUPPLY TANK AND A SERVICE CONTAINER

(75) Inventor: Patrick Mathéoud, Villeneuve la Garenne (FR)

(73) Assignee: Messer France, S.A. (FR)

( * ) Notice: Subject to any disclaimer, the term of this patent is extended or adjusted under 35 U.S.C. 154(b) by 25 days.

(21) Appl. No.: 10/477,332

(22) PCT Filed: Apr. 3, 2002

(86) PCT No.: PCT/EP02/03684

§ 371 (c)(1), (2), (4) Date: Nov. 6, 2003

(87) PCT Pub. No.: WO02/081963

PCT Pub. Date: Oct. 17, 2002

(65) Prior Publication Data

US 2004/0148945 A1 Aug. 5, 2004

(30) Foreign Application Priority Data

Apr. 3, 2001 (FR) ............................................ 01 04492

(51) Int. Cl.[7] ............................ F17C 3/10; B65G 1/20; B65G 1/28

(52) U.S. Cl. .......................................... 62/48.2; 141/82

(58) Field of Search ................................ 62/48.2, 50.2, 62/49.1, 500; 141/82

(56) References Cited

U.S. PATENT DOCUMENTS

| | | | | | |
|---|---|---|---|---|---|
| 3,733,838 | A | * | 5/1973 | Delahunty | 62/48.2 |
| 3,800,550 | A | * | 4/1974 | Delahunty | 62/47.1 |
| 4,422,301 | A | * | 12/1983 | Watt et al. | 62/48.2 |
| 5,505,232 | A | * | 4/1996 | Barclay | 141/11 |
| 6,044,647 | A | * | 4/2000 | Drube et al. | 62/50.1 |
| 6,145,321 | A | * | 11/2000 | Miller et al. | 62/48.2 |
| 6,302,164 | B1 | * | 10/2001 | Nitecki et al. | 141/45 |
| 6,408,895 | B1 | * | 6/2002 | Beam | 141/59 |
| 2001/0042377 | A1 | * | 11/2001 | Pozivil | 62/48.3 |

* cited by examiner

*Primary Examiner*—William C. Doerrler
(74) *Attorney, Agent, or Firm*—Connolly, Bove Lodge & Hutz

(57) ABSTRACT

Supply of liquefied gases. The plant is characterized in that: *the withdrawal outlet is provided with a transfer pump (16) and with an ejector (17) which are located upstream of the fitting (11); *the ullage space of the container is equipped with a gas phase recycling line (5) equipped with a fitting (15); and * heat exchange means (19) are interposed in order to:—condense all or a portion of the recycled gas phase from the container and reinject it in liquid form into the ejector where any further condensation is completed,—vaporize a portion of the liquid phase from the tank in order to maintain the gas phase occupying the ullage space of the latter. Application to the filling of several containers by a mobile tank.

20 Claims, 1 Drawing Sheet

METHOD AND PLANT FOR DISCHARGING A LIQUEFIED GAS BETWEEN A MOBILE SUPPLY TANK AND A SERVICE CONTAINER

The technical field to which the present invention relates is that of liquefied gases which are stored on sites of use by means of containers in which the said products are confined as a liquid phase surmounted by a gas phase resulting from equilibrium between pressure and temperature, these being specific to the said products.

The invention relates more particularly to the storage of liquefied gases which are maintained at a low temperature below room temperature and more particularly, at a low temperature below zero degrees on the Celsius scale.

The subject of the invention is more specifically the storage of liquefied gases whose gas density/liquid density ratio in high. As examples, mention should be made of carbon dioxide and nitrous oxide.

The invention relates more specifically to storage containers which have to be filled, at least partly, with a liquid phase in order to compensate for the consumption of gas which occurs through its use. As a general rule, containers of the abovementioned type are filled from a mobile tank or tanker, generally a road tanker, which is filled on the site where the liquefied gaseous product is produced, so that the tank also contains a liquid phase surmounted by a gas phase resulting, as in the case of the container, in equilibrium between pressure and temperature.

Each tank has a capacity allowing it to fill a certain number of containers, which may be up to five or six.

Such a practice, implemented over many years, has shown that there is a risk of cross contamination of the liquefied gas contained in the tank because of the successive connections made to various containers, the gaseous and/ore liquefied products of which may have been contaminated as a result of their use.

This is because when the tank is connected to a container, a portion of the liquid phase from the tank is transferred to the container, consequently increasing the pressure of the gas phase in the latter.

To avoid problems and loss of gas which would without fail result from opening the safety valve of the container, it is common practice to make a connection between the ullage space of the container and the ullage space of the tank, so as to recycle a portion of the gas phase from the container to the tank. The objective of such recycling is to solve the above problem, but also to re-establish the pressure of the gas phase in the tank, which pressure naturally tends to drop because of discharge of the liquid phase.

Such a connection is also regarded as unavoidable when it is necessary to take into account the maximum amount of the liquid phase that can be discharged from the tank, which can arise only if the pressure of the gas phase is high enough, even when the withdrawal is undertaken by means of a pump.

This recirculation from the container towards the tank therefore has the risk of contaminating the liquefied gas contained in this tank with the secondary risk of contaminating the liquid product of a second or nth container that the tanker is charged with filling subsequently.

Such a risk is deemed to be unacceptable when the use of the liquefied gas relates to food applications, in particular such as fizzy drinks.

It might be considered that in the case of gases stored at room temperature, the problem of cross contamination could be eliminated by preventing the recycling backflow of the gas phase from the container.

In such a situation, one may count on the fact that, even if an increase in pressure in the container occurs as the result of a temperature rise, the cooling by the ambient temperature is likely to re-establish suitable storage conditions in the container. In such a case, owing to the reverse phenomenon, one may similarly count on sufficient heating of the tank to maintain the pressure within the gas phase.

It might also be considered that in the case of liquid gases, especially air, stored at a pressure close to atmospheric pressure but at a much lower temperature, for example at about −200° C., in the tank, transfer into the container, where the operating pressure is of the order of 10 bar at a temperature higher than that in the tank, would cause self-regulation taking place below the setpoint pressure of the container.

In both the above cases, recycling of the gas phase towards the tank does not have to be considered, so that the problem of cross contamination does not arise.

Such is not the case with liquefied gases stored at a low temperature, below zero on the Celsius scale, for example at −20° C., which threshold temperature is regarded as a deliberately chosen compromise between the cost of the insulation that would be necessary and the cost of constructional modification of the strength of the tank.

It might be considered that the problem that arises in the intended technical field could be solved by dispensing with the recycling of the gas phase from the container provided that non-return and automatic valves are installed on the container, which valves constitute perhaps effective technical means but are certainly costly to install and maintain. However, with such a plant the liquefied gas supplier can in no way be certain that all the containers that he is responsible for filling are indeed equipped with such technical means. Finally, such a plant, by its operation, lets a portion of the pressurized gas phase escape into the atmosphere, to the detriment of the filling economics.

Nor is it pointless to note that such a plant does not solve the problem of the drop in pressure in the tank as discharging progresses. One might consider that thins problem could be overcome by placing an external vaporizer on a branch line removing from the tank a portion of the liquid phase that it contains in order to maintain the production of a gas phase which would be recycled into the ullage space of the said tank. Such a solution is not conceivable in the case of liquefied gases such as $CO_2$, the ratio of the liquid phase density to the gas phase density of which is not favourable. This is because the energy that has to be supplied to the liquid in the tank in order to maintain constant pressure therein during the discharging operation is equal to:

$$\frac{P_G}{P_L} M_L \times (h_G - h_L)$$

$M_L$=mass of liquid to be discharged;

$P_G$, $P_L$=gas phase density, liquid phase density;

$h_G$, $h_L$=gas phase enthalpy, liquid phase enthalpy.

For $CO_2$, these parameters have the values below:

$P_G$, $P_L$=0.050;

$h_G$, $h_L$=67;

Kw/TON/h=3,922;

Temperature=−20° C.

It will be appreciated that there is a factor of 6, which explains that the existing solutions for products stored at very low temperature have not been able to be transposed. This is because, in order to be able to obtain suitable compensation, they would involve the use of energy means whose installation and running costs would be prohibitive.

The object of the invention is to solve such a problem in order to avoid the risk of cross contamination in the field of use of liquefied gases stored at relatively low temperatures compared with room temperature or at zero degrees on the Celsius scale, for which gases the ratio of the gas phase density to the liquid phase density is, furthermore, high.

The object of the invention is to solve the present problem by using technical means which are relatively inexpensive to install and maintain and which furthermore, in order to prevent such cross contamination, give not only the user of the container but also the liquefied gas supplier complete control of the operation.

Another object of the invention is to provide technical means which also solve a problem generally regarded as inherent in liquefied gas discharging operations, namely the determination of the exact amount of liquefied products transferred from the tank to the container, on the basis of which determination the delivery invoicing has to be based.

To achieve the above objectives, the discharging method is characterized in that it consists in:

- withdrawing the liquid phase of the said gas from the tank in order to introduce it into the bottom of the container via an ejector;
- at the same time removing from the ullage space of the container a portion of the gas phase in order to condense it, at least partly, in a heat exchanger before it is reintroduced into the bottom of the said container by means of the ejector where condensation is completed;
- utilizing the heat given up by the said gas phase in the heat exchanger to vaporize a portion of the liquid phase in the tank so as to maintain, in the latter, a gas phase favourable to pressure-temperature equilibrium in the tank despite the discharging.

The subject of the invention is also a plant for implementing the above method, such a plant being characterized-in that:

- the withdrawal line is provided with a transfer pump and with an ejector which are located upstream of the fitting;
- the ullage space of the container is provided with a gas phase recycling line equipped with a fitting; and
- heat exchange means are interposed in order to:
  - condense all or a portion of the recycled gas phase from the container and reinject it in liquid form into the ejector where any further condensation is completed,
  - vaporize a portion of the liquid phase from the tank in order to maintain the gas phase occupying the ullage space of the latter, Various other features will become apparent from the description given below with reference to the appended drawing which shows, by way of non-limiting examples, embodiments of subject-matter of the invention.

Figure 1:
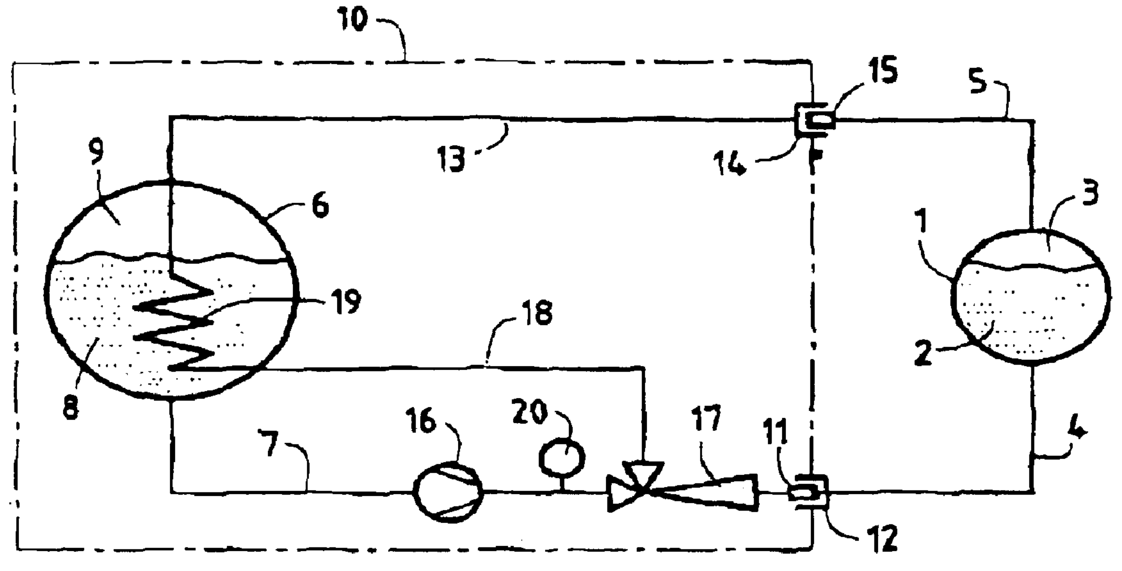
FIG. 1 is a diagram illustrating the plant according to the invention.

According to FIG. 1, the embodiment shown involves a container 1 intended to contain a liquid phase 2 of an appropriate liquefied gas, surmounted by a gas phase 3, the combination being stored, under equilibrium temperature and pressure conditions, at a relatively low temperature, compared with zero on the Celsius scale, and for example at −20° C. The container 1 is connected to one or more lines for withdrawing either the gas phase or the liquid phase, for a given application, these lines not being shown in FIG. 1. On the other hand, the container 1 does have a bottom line 4 for filling with the liquid phase and a top line 5 for recycling the gas phase according the method described below.

Periodic filling of the container 1, in order to make up for the losses due to the use of the liquefied gas stored, is provided by means of a tank 6 which may be termed a mobile tank, that is to say one made mobile by being transported by a road tanker for example, so as to be able to be used for successively filling several containers 1 with product from a single liquefied gas production site. The tank 6 includes a transfer line 7 connected at the bottom of the tank intended to contain a liquid phase 8 of the liquefied gas, such a phase being surmounted by a gas phase 9, the pressure and temperature equilibrium of which meets the same requirements as succinctly mentioned above in the case of the container 1. It should of course be understood within the meaning of the invention that the liquefied gas provided by the tank 6 is identical to that stored in the container 1.

The tank 6 forms part of a plant 10 bounded by the frame in dot-dash lines, indicating that the transfer line 7 is provided with a fitting 11 complementary to a suitable fitting 12 on the intake line 4. Likewise, the tank 6 includes an inflow line 13 which is provided with a fitting 14 that can be connected to a complementary fitting 15 with which the recycling line 5 is equipped.

The plant 10 also makes use of a withdrawal pump 16 which is fitted onto the transfer line 7, located upstream of an ejector 17 which is itself placed upstream of the fitting 11. The tank 6 is furthermore equipped with an outflow line 18 which is connected to the ejector 17.

According to a constructional arrangement specific to the embodiment according to FIG. 1, the plant 10 also includes heat exchange means which, in this example, involve a heat exchanger 19 of the one-way type, which is incorporated into the tank 6 so as to be immersed in the liquid phase 8. The exchanger 19 is connected to the inflow line 13 and to the outflow line 18 respectively.

The plant described above allows the following method to be implemented when it is necessary to fill the container 1.

The complementary fittings 11–12 and 14–15 are coupled so as to connect the plant 10 to the line 4 and to the line 5 so as to establish a closed circuit with the lines 13 and 18 via the heat exchanger 19.

In this state, the pump 16 is switched on so as to withdraw liquid phase B from the tank 6 and send it via the ejector 17 into the line 4 in order to fill the container 1.

As a consequence of this filling operation, the gas phase 3 tends to rise in pressure in the ullage space of the container 1 and consequently flows into the recycling line 5, to be sent by the inflow line 13 into the heat exchanger 19.

Because the exchanger is positioned within the liquid phase 8, the gas phase coming from the ullage space of the container 1 is condensed and can then, of course, flow through the outflow line 18 to be reinjected, generally in an at least partially liquid form, into the ejector 17 where any further condensation is completed.

In this way, the container 1 is fed via the transfer line 7 with liquefied gas without as a result any appreciable modifications in the liquid phase/gas phase equilibrium within the container 1. Simultaneously, the heat transferred into the liquid phase 8 from the recycled gas phase, in order to condense the latter, causes partial vaporization of this liquid phase, which vaporization contributes to maintaining the equilibrium of the gas phase 9 in the tank 6 despite the withdrawal of the liquid phase by means of the 16.

The container 1 may be filled by the above means without any risk of cross contamination of the gas with the liquid or gas phase stored in the tank 6, given that the gas phase coming from the ullage space of the container 1 is forced to flow in a closed circuit eliminating any risk of contamination and allowing the optimum transfer conditions to be maintained because the recycled gas phase condenses within the tank 6.

Such conditions make it possible in addition to know with real certainty the amount of product in liquid phase taken from the tank 6, so that all that in required, in order to determine the exact amount of product in liquid phase transferred into the container 1, is to install flow-measuring means such as 20 interposed between the pump 16 and the ejector 17.

It should be noted that one of the important aspects of the method consists in controlling, during the filling operation, the recycling of the gas phase 3 from the container 1 and in confining this recycled gas phase within a closed circuit which is utilized so that the heat given up by this gas phase in the cooling medium that constitutes the liquid phase in the tank 6 partly vaporizes this liquid phase in order to maintain a gas phase under suitable pressure in the tank 6, allowing optimum discharging of the mass of liquefied gas contained in the tank 6.

Figure 2:
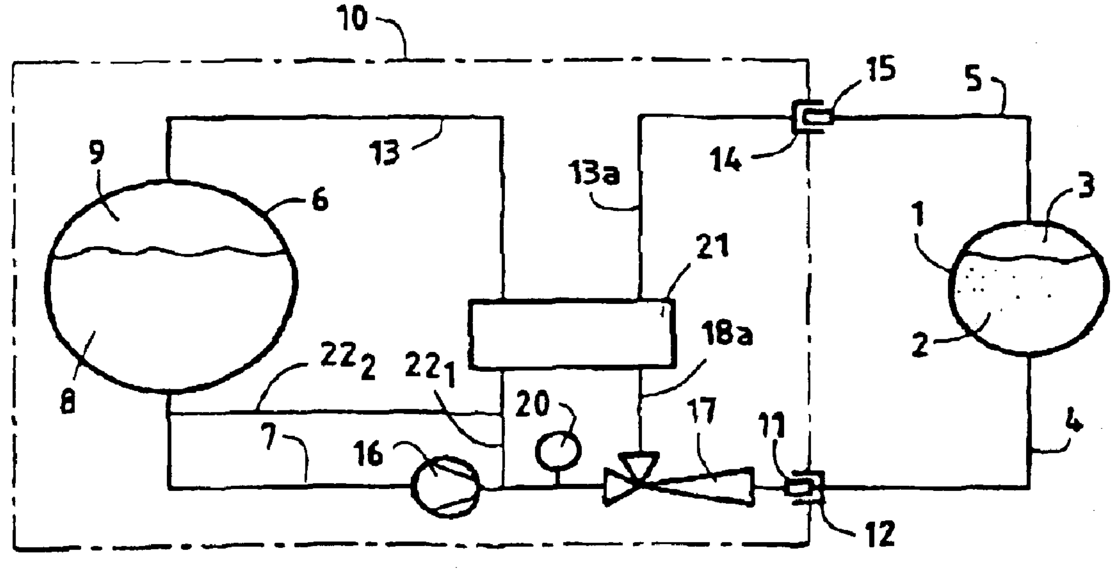
FIG. 2 is a diagram illustrating an alternative embodiment.

An alternative embodiment is illustrated in FIG. 2, in which the plant 10 uses heat exchange means different from those used in the embodiment in FIG. 1. This is because, according to this alternative embodiment, the heat exchange means consist of a heat exchanger 21 of the two-way type, which is placed outside the tank 6. One of the ways of the exchanger 21 is connected to the recycling line 5 and to the recirculation line 4, via an inflow branch 13*a* and via an outflow branch 18*a*, respectively. The branches 13*a* and 18*a* belong to the plant 10 and have the particular feature, in the case of one of them, of being able to be connected up via the fittings 14 and 15 to the recycling line 5 and, in the case of the other one, of being permanently connected to the ejector 17. In this alternative embodiment, the fittings 11 and 12 are provided between the recirculation line 4 and the transfer line 7 as regards its part lying beyond the ejector 17.

In this alternative embodiment, the second way of the exchanger 21 is connected to the inflow line 13 and to a branch line 22, which is branched off either directly from the transfer line 7 upstream of the pump 16 or, on the contrary, from this line but in its part lying between the pump 16 and the ejector 17. The branch line bears the reference $\mathbf{22_1}$ or $\mathbf{22_2}$, depending on the mode of branching.

The exchanger 21 is in such a case of the plate or finned type, as is known to those skilled in the art.

According to this alternative embodiment, the discharging method involves withdrawal by the pump 16 from the tank 6 and filling of the container 1 as soon as the fittings 14 and 15 and 11 and 12 have been mated in order to connect the plant 10 to the said container.

The gas phase 3 recycled by the line 5 from the container 1 flows through the inflow branch 13*a,* in order to pass through the exchanger 21 within which it condenses according to the conditions indicated above.

The at least partially condensed phase from the recycled gas phase is re-introduced via the outflow branch 16*a* into the ejector 17 so as to re-introduce it into the container 1.

Considering the branch $\mathbf{22_1}$, it will be understood that natural circulation:is set up by the withdrawal by the pump 16 in such a way that a portion of the withdrawn liquid phase 8 flows along this branch before passing through the exchanger 21 within which it cools the recycled gas phase from the container 1 so as to condense it. Conversely, the heat removed from the condensing gas phase causes vaporization of the portion of the liquid phase 8 which flows on in the line 13 in gaseous form, so as to maintain, in the ullage space of the tank 6, temperature and pressure conditions which are favourable to the natural equilibrium of the stored product and, especially, to the maintaining of a pressure suitable for proper execution of the withdrawal.

Considering the branch $\mathbf{22_2}$, it may be seen that the step of vaporizing the liquid phase coming from the tank 6 takes place by forced circulation of a portion of the liquid phase 8 withdrawn by the pump 16.

As in the previous example, flow-measuring means 20 are placed in the transfer line 7, but this time these being interposed between the ejector 17 and the fitting for the branch $\mathbf{22_2}$.

It should be noted that in both the embodiments used to implement the method as described, the mear necessary for carrying out the method all belong to the plant 10 forming part of the tank 6. Consequently, the supplier has real control of the means employed to prevent any cross contamination.

These technical means make it possible to recycle, with neither any interference nor contact, the gas phase from the container 1 during filling so as to maintain the pressure-temperature equilibrium conditions in the tank 6 and give complete control of the means capable of preventing any risk of cross contamination directly to the supplier by requiring him, as a simple constraint, prior to the actual discharging operations, merely to inert that part of the plant circuit in which the gas phase 3 coming from the container 1 is to flow. The "part relating to the plant" should therefore include, within the context of FIG. 1, the inflow line 13, the exchanger 19, the outflow line 18 and the ejector 17 and, within the context of FIG. 2, the branch 13*a,* the circuit corresponding to the exchanger 21, the branch 18*a* and the ejector 17.

The invention is not limited to the examples described and shown, as various modifications may be made thereto without departing from its scope.

What is claimed is:

1. Method of discharging a liquefied gas stored in a supply tank at a relatively low temperature, below zero degrees on the Celsius scale, between the said tank and a service container, characterized in that it comprises:

withdrawing the liquid phase of the said gas from the tank in order to introduce it into the container via an ejector;

at the same time removing from the ullage space of the container a portion of the gas phase in order to condense it, at least partly, in a heat exchanger before it is reintroduced into the said container by means of the ejector where condensation is completed with none of the removed gas phase being introduced into and mixing with the liquefied gas stored in the supply tank;

utilizing the heat given up by the said gas phase in the heat exchanger to vaporize a portion of the liquid phase in the tank so as to maintain, in the latter, a gas phase favorable to pressure-temperature equilibrium in the tank despite the discharging.

2. Method according to claim 1, characterized in that the gas phase coming from the ullage space of the container is made to pass through the heat exchanger which is immersed in the liquid phase contained in the tank.

3. Method according to claim 1, characterized in that the gas phase coming from the ullage space of the container is made to flow through one of the circuits of an external two-way heat exchanger, a portion of the liquid phase withdrawn from the tank flowing through the other circuit of the two-way heat exchanger, and in that a gas phase is thus produced which is recycled into the ullage space of the tank.

4. Method according to claim 3, characterized in that there is natural circulation between the tank and the external exchanger.

5. Method according to claim 3, characterized in that there is forced circulation between the tank and the external exchanger.

6. Method according to claim 5, characterized in that there is forced circulation by means of the pump for withdrawing the product from the tank.

7. Method according to claim 6, characterized in that the amount of liquid phase transferred from the tank to the container is measured by a flowmeter between the transfer pump and the ejector.

8. Discharging plant for implementing the method according to claim 1 of the type comprising a tank provided with a withdrawal outlet equipped with a fitting and a container provided with an intake line equipped with a fitting complementary to that of the withdrawal outlet, characterized in that:

- the withdrawal line is provided with a transfer pump and with an ejector which are located upstream of the withdrawal outlet fitting;
- the ullage space of the container is provided with a gas phase recycling line equipped with a fitting;
- heat exchange structure interposed in order to: condense at least a portion of the recycled gas phase from the container and reinject it in liquid form into the ejector where any further condensation is completed, vaporize a portion of the liquid phase from the tank in order to maintain the gas phase occupying the ullage space of the latter and
- the heat exchange structure and the container being in a closed flow circuit separate from the tank whereby none of the gas phase removed from the container is introduced into and mixed with liquefied gas stored in the tank.

9. Plant according to claim 8, characterized in that the heat exchange structure comprises a one-way heat exchanger, inside the tank, the flow circuit of which, in which the gas phase coming from the ullage space of the container flows, comprises, on the one hand, the recycling line provided with the fitting complementary to the fitting with which an inflow line carried by the tank is equipped and, on the other hand, a recirculation line provided with a fitting complementary to the fitting carried by the transfer line, an outflow line, which passes through the tank and extends the exchanger, termination in the ejector of the said transfer line.

10. Plant according to claim 8, characterized in that the heat exchange structure comprises, external to the tank, a heat exchanger of the two-way type, one way of which is connected to the recycling line and to the ejector and the other way of which is connected to the inflow line of the tank and to an outflow line conveying the product in liquid phase coming from the tank.

11. Plant according to claim 10, characterized in that the recycling and inflow lines are provided with complementary fittings and in that the heat exchanger forms part of the equipment of the tank.

12. Plant according to claim 10, characterized in that the outflow line is branched off a transfer line upstream of the pump.

13. Plant according to claim 10, characterized in that the outflow line is branched off a transfer line downstream of the pump.

14. Plant according to claim 13, characterized in that the transfer line includes flow measuring means placed downstream of the pump.

15. Plant according to claim 8, characterized in that the transfer line includes flow measuring means placed downstream of the pump.

16. Plant according to claim 8, characterized in that the heat exchange structure condenses all of the recycled gas phase.

17. Method according to claim 1, characterized in that the amount of liquid phase transferred from the tank to the container is measured by a flowmeter between the transfer pump and the ejector.

18. Plant according to claim 8, characterized in that the plant includes a part having as its components the tank and the withdrawal line and the transfer pump and the ejector and the heat exchange structure and the fitting at the withdrawal outlet and an inflow line for feeding the gas phase from the container ullage to the heat exchanger, the plant including a separate assembly comprising the container and the intake line and its fitting and the gas phase recyline line and its fitting, and the plant part being a unit separate and distinct from the assembly and being selectively connectable to the assembly by the respective matings of the fittings whereby a supplier of the liquefied gas has control over the components of the plant part.

19. Plant according to claim 18, characterized in that the plant part is mounted on a road tanker to be mobile, and the intake line is mounted at the bottom of the container.

20. Method according to claim 1, characterized in that the supply tank is a mobile supply tank, and introducing the liquid phase into the bottom of the container.

* * * * *